United States Patent
Muyzert et al.

(10) Patent No.: US 8,654,606 B2
(45) Date of Patent: Feb. 18, 2014

(54) OBTAINING A RESPONSE BASED ON DIFFERENCING OF OUTPUTS OF SENSORS

(75) Inventors: Everhard Muyzert, Girton (GB); Pascal Edme, Cambridge (GB); Julian Edward Kragh, Finchingfield (GB)

(73) Assignee: WesternGeco L.L.C., Houston, TX (US)

( * ) Notice: Subject to any disclaimer, the term of this patent is extended or adjusted under 35 U.S.C. 154(b) by 590 days.

(21) Appl. No.: 12/844,016

(22) Filed: Jul. 27, 2010

(65) Prior Publication Data

US 2012/0026834 A1 Feb. 2, 2012

(51) Int. Cl.
*G01V 1/28* (2006.01)
*G01S 3/80* (2006.01)

(52) U.S. Cl.
USPC .............................. 367/58; 367/129; 181/112

(58) Field of Classification Search
USPC .............. 181/112, 122; 367/14, 58, 129, 153, 367/154, 178
See application file for complete search history.

(56) References Cited

U.S. PATENT DOCUMENTS

| | | | | |
|---|---|---|---|---|
| 2,678,107 A * | 5/1954 | Woods | ........................... | 367/58 |
| 2,982,942 A * | 5/1961 | White | ........................... | 367/125 |
| 3,344,881 A * | 10/1967 | White | ........................... | 367/48 |
| 3,475,722 A * | 10/1969 | White | ........................... | 367/31 |
| 3,506,957 A * | 4/1970 | Davison | ........................ | 367/36 |
| 3,576,522 A * | 4/1971 | Doty et al. | ..................... | 367/40 |
| 4,072,922 A * | 2/1978 | Taner et al. | .................... | 367/56 |
| 4,078,223 A * | 3/1978 | Strange | .......................... | 367/58 |
| 4,143,350 A * | 3/1979 | Keown | .......................... | 367/131 |
| 4,163,206 A | 7/1979 | Hall, Jr. | | |
| 4,300,220 A * | 11/1981 | Goff et al. | ..................... | 367/188 |
| 4,334,296 A | 6/1982 | Hall, Jr. | | |
| 4,458,341 A * | 7/1984 | Goebel | .......................... | 367/43 |
| 4,534,020 A * | 8/1985 | O'Brien | ........................ | 367/188 |
| 4,599,713 A | 7/1986 | Rudaz | | |
| 4,811,814 A * | 3/1989 | Staron et al. | .................. | 181/108 |
| 5,010,531 A * | 4/1991 | McNeel | ........................ | 367/188 |
| 5,070,484 A * | 12/1991 | Mantel | ......................... | 367/124 |
| 5,214,614 A * | 5/1993 | Baule | .............................. | 367/58 |
| 5,555,530 A * | 9/1996 | Meehan | ......................... | 367/45 |
| 5,763,982 A * | 6/1998 | Tabota et al. | ................. | 310/329 |
| 6,366,537 B1 * | 4/2002 | Sambuelli et al. | ............ | 367/178 |

(Continued)

FOREIGN PATENT DOCUMENTS

| | | |
|---|---|---|
| EP | 0736781 A1 | 9/1996 |
| FR | 2738642 A1 | 3/1997 |
| GB | 1256304 | 12/1971 |

OTHER PUBLICATIONS

Andreas Stark, Seismic Methods and Applications: A Guide for the Detection of Geologic Structures, Earthquake Zones and Hazards, Resource Exploration, and Geotechnical Engineering, Universal Publishers, 2008, Chapter 5, pp. 121-123.*

(Continued)

*Primary Examiner* — Ian J Lobo

(57) ABSTRACT

A sensor assembly has first sensors spaced apart along a first direction, and second sensors oriented in a second direction generally orthogonal to the first direction. Differencing of outputs of the first sensors is performed, and differencing of outputs of the second sensors is performed. A signal output is produced by combining the differenced outputs of the first sensors and the differenced outputs of the second sensors, where the signal output represents a seismic response of a subterranean structure.

21 Claims, 5 Drawing Sheets

(56) References Cited

U.S. PATENT DOCUMENTS

| | | | |
|---|---|---|---|
| 6,519,205 B1* | 2/2003 | Baeten et al. | 367/45 |
| 7,324,406 B2* | 1/2008 | Berg | 367/15 |
| 2006/0133202 A1* | 6/2006 | Tenghamn | 367/24 |
| 2007/0153631 A1 | 7/2007 | Menard et al. | |
| 2008/0006474 A1* | 1/2008 | Tonelli et al. | 181/122 |
| 2008/0316860 A1* | 12/2008 | Muyzert et al. | 367/25 |

OTHER PUBLICATIONS

Robertsson, Johan O. A., et al., Wavefield separation using densely deployed three-component single-sensor groups in land surface-seismic recordings, Geophisics, Sep.-Oct. 2002, pp. 1624-1633, vol. 67, No. 5, Society of Exploration Geophysicists.

Ralston, Matthew, et al., A Three-Component Acquistion System, Geophysics, California Department of Transportation, 2002.

* cited by examiner

OBTAINING A RESPONSE BASED ON DIFFERENCING OF OUTPUTS OF SENSORS

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for receipt by seismic receivers (e.g., geophones, accelerometers, etc.). These seismic receivers produce signals that represent detected seismic waves. Signals from the seismic receivers are processed to yield information about the content and characteristic of the subterranean structure.

A typical land-based seismic survey arrangement includes deploying an array of seismic receivers on the ground with the seismic receivers provided in an approximate grid formation. Most such survey arrangements have only seismic receivers oriented in the vertical direction. Some seismic surveys have multi-component seismic receivers or geophones that enable the measurement of an incoming wavefield (in velocity or acceleration) in three orthogonal directions (vertical z, horizontal inline x, and horizontal crossline y).

For land-based seismic surveying, various types of unwanted wavefields may be present, including ground-roll noise, such as Rayleigh or Love surface waves. The unwanted wavefields can contaminate seismic data acquired by seismic receivers. Although various conventional techniques exist to remove unwanted wavefields from seismic data, such techniques are relatively complex and may be costly.

SUMMARY

In general, according to an embodiment, a sensor assembly has first sensors spaced apart along a first direction, and second sensors oriented in a second direction generally orthogonal to the first direction. Differencing of outputs of the first sensors is performed and differencing of outputs of the second sensors is performed, and a signal output is produced by combining the differenced outputs of the first and second sensors, where the signal output represents a seismic divergence response of a subterranean structure. The divergence output can be used for noise mitigation or other purposes.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
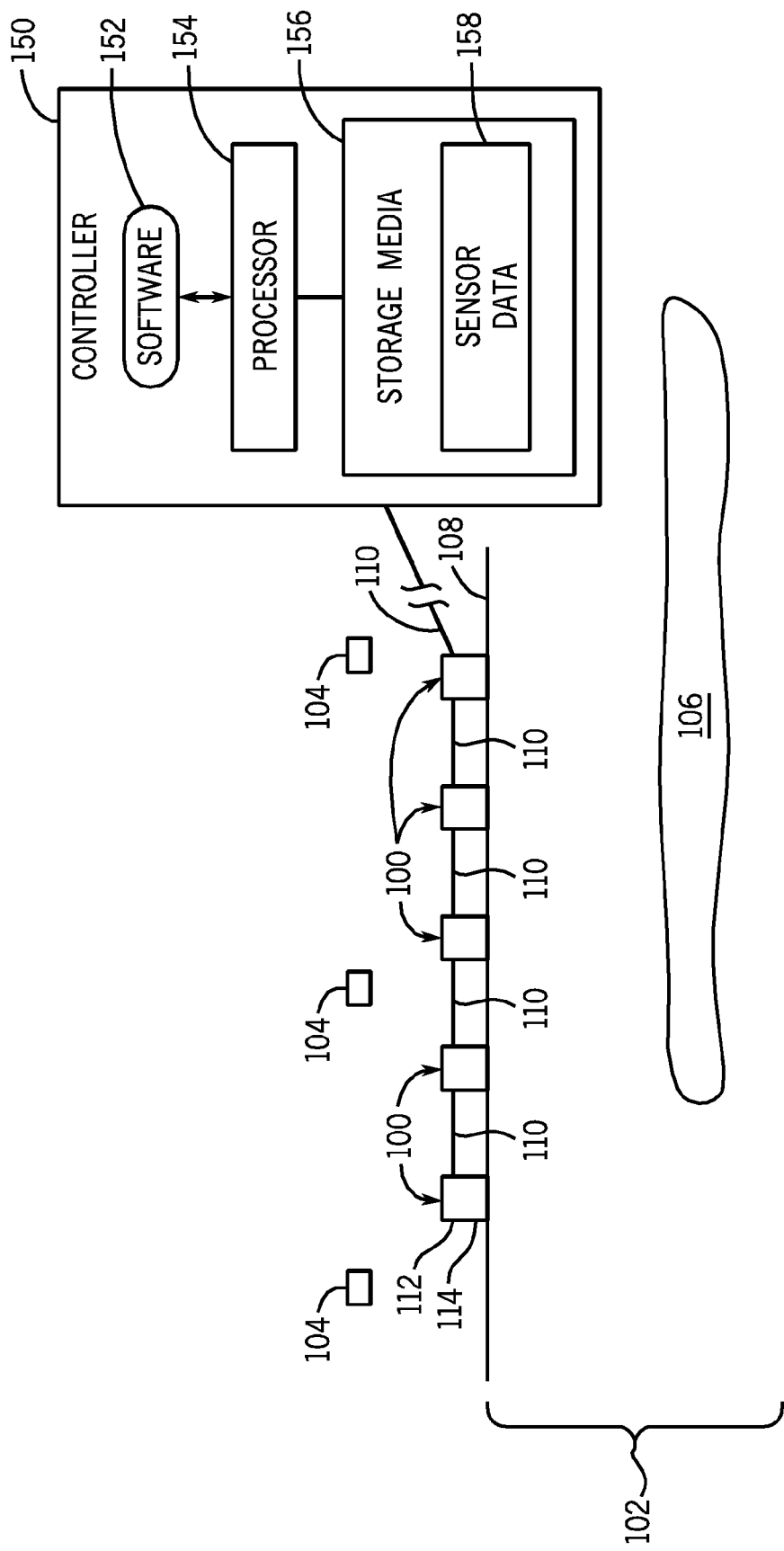
FIG. 1 is a schematic diagram of an example arrangement of sensor assemblies that can be deployed to perform a land-based seismic survey, according to an embodiment.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to certain scenarios, such terms may refer to a left to right, right to left, or diagonal relationship as appropriate.

In accordance with some embodiments, to attenuate or mitigate noise in seismic data in a survey arrangement, such as a land-based survey arrangement, sensor assemblies are provided where at least one of the sensor assemblies has a predefined configuration of seismic sensors to allow for noise mitigation and/or for other purposes. Generally, the sensor assembly has first seismic sensors spaced apart along a first direction (which can be a generally horizontal direction) for measuring seismic signals along the first direction. Moreover, the sensor assembly may include second seismic sensors oriented in a second horizontal direction generally orthogonal to the first direction. More generally, the first seismic sensors and second seismic sensors are arranged in the same plane (which can be a horizontal plane or a sloped plane). In addition, the sensor assembly may also include at least one seismic sensor oriented in the generally vertical direction (or other direction perpendicular to the plane in which the first and second seismic sensors are arranged).

Differencing of outputs of the first seismic sensors is performed. In addition, differencing of the outputs of the second seismic sensors is performed. "Differencing" outputs of sensors refers to taking a difference between values corresponding to the outputs of respective sensors, where each "value" can be the value of the output of the sensor, or a calibrated (or otherwise adjusted) value based on the output of the sensor. A signal output is produced based on combining (e.g., summing or other type of aggregating) the differenced outputs of the first sensors and differenced outputs of the second sensors. This signal output is proportional to the divergence of the seismic wavefield.

As used here, the phrase "generally horizontal direction" or "generally vertical direction" refers to an orientation that is substantially horizontal or vertical, respectively. "Substantially horizontal" refers to an orientation that is exactly horizontal or that is within ±20° or ±30° of the horizontal orientation. "Substantially vertical" refers to an orientation that is exactly vertical or within ±20° or ±30° of the vertical.

One application of the sensor assembly is to mitigate noise in the seismic data, where the noise includes ground-roll noise. Ground-roll noise refers to seismic waves produced by seismic sources that travel generally horizontally along a ground surface towards seismic receivers. These horizontally traveling seismic, such as Rayleigh waves or Love waves, are undesirable components that can contaminate seismic data. Generally, "noise" refers to any signal component that is unwanted from seismic data (such as data representing reflected seismic signals from subterranean elements). Other types of noise include flexural waves present in data acquired over frozen surfaces such as a body of water or permafrost; or airborne noise caused by the environment such as due to wind, rain, or human activity such as traffic, air blasts, flare noise, or other industrial processes.

In certain implementations, the seismic sensors in the second horizontal direction may be omitted. In this case the divergence of the wavefield is only estimated from the seismic sensors in the first horizontal direction. This may be appropriate when seismic signal and noise is predominantly propagating in the first direction.

FIG. 1 is a schematic diagram of an arrangement of sensor assemblies 100 that are used for land-based seismic surveying. The sensor assemblies 100 are deployed on a ground surface 108 (in a row or in an array or in some other pattern). A sensor assembly 100 being "on" a ground surface means that the sensor assembly 100 is either provided on and over the ground surface, or buried (fully or partially) underneath the ground surface. The ground surface 108 is above a subterranean structure 102 that contains at least one subterranean element 106 of interest (e.g., hydrocarbon reservoir, freshwater aquifer, gas injection zone, etc.). One or more seismic sources 104, which can be vibrators, air guns, explosive devices, and so forth, are deployed in a survey field in which the sensor assemblies 100 are located. Although the seismic sources 104 are depicted in FIG. 1 as being above the ground surface 108, that has been done to allow the seismic sources 104 to be more visibly seen in the diagram. The seismic sources 104 are actually located on the ground surface 108 (or partially or fully buried in the ground surface 108).

Activation of the seismic sources 104 causes seismic waves to be propagated into the subterranean structure 102. Alternatively, instead of using controlled seismic sources as noted above to provide controlled source or active surveys, some embodiments can also be used in the context of passive surveys. Passive surveys use the sensor assemblies 100 to perform one or more of the following: (micro)earthquake monitoring; hydro-frac monitoring where microearthquakes are observed due to rock failure caused by fluids that are actively injected into the subsurface, such as a hydrocarbon reservoir; ambient noise monitoring, such as interferometric surveys and spectral ratio inversions; and so forth.

Seismic waves reflected from the subterranean structure 102 (and from the subterranean element 106 of interest) are propagated upwardly towards the sensor assemblies 100. Seismic sensors (e.g., geophones, accelerometers, optical sensors, velocity sensors, motion sensors, etc.) in the corresponding sensor assemblies 100 measure the seismic waves reflected from the subterranean structure 102 as noted above, as well as noise such as horizontally propagating waves.

In one embodiment, the sensor assemblies 100 are interconnected by an electrical cable 110 (or other type of communication medium) to a controller 150. Alternatively, instead of connecting the sensor assemblies 100 by the electrical cable 110, the sensor assemblies 100 can communicate wirelessly with the controller 150 (for cable-free sensor assemblies). In some implementations, intermediate routers or concentrators may be provided at intermediate points of the network of sensor assemblies 100 to enable communication between the sensor assemblies 100 and the controller 150. Another type of cable-free sensor assembly includes a sensor assembly that includes local storage to store measurement data—the stored measurement data can be later collected manually, such as by connecting another device to the sensor assembly.

The controller 150 shown in FIG. 1 further includes processing software 152 that is executable on a processor 154. The processor 154 is connected to storage media 156 (e.g., one or more disk-based storage devices and/or one or more memory devices).

The storage media 156 is used to store sensor data 158. The sensor data 158 includes output data produced by each of the sensor assemblies 100. In operation, the software 152 in the controller 150 is executable to process the sensor data 158 to produce an output to characterize the subterranean structure 102.

Figure 2:
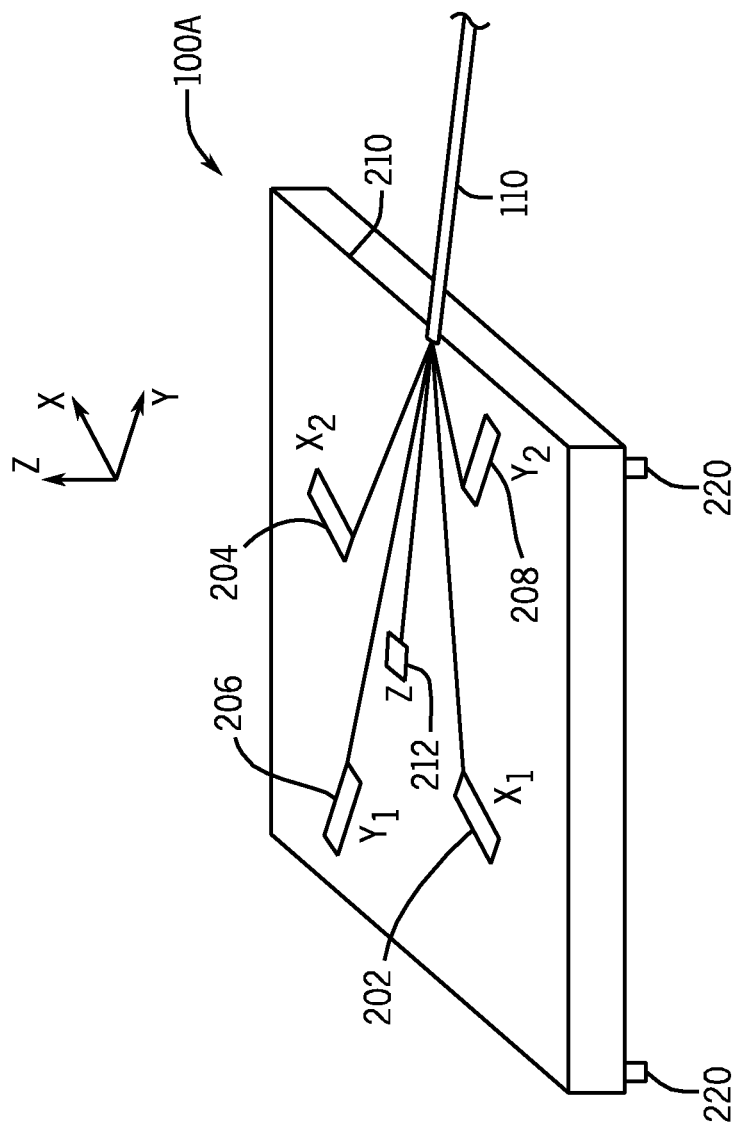
FIGS. 2-4 are schematic diagrams of different embodiments of a sensor assembly.

FIG. 2 illustrates an example arrangement of seismic sensors in a sensor assembly 100A, according to an embodiment. A first pair of horizontal seismic sensors 202 and 204 and a second pair of horizontal seismic sensors 206 and 208 are all mounted on a support structure 210. A "horizontal seismic sensor" refers to a seismic sensor arranged to measure seismic ground motion along generally a horizontal direction.

The support structure 210 can be a plate or frame that is contacted to a ground surface (208 in FIG. 1), for example. The first pair of seismic sensors 202 and 204 measure signals generally along the x direction, while the second pair of seismic sensors 206 and 208 measure seismic signals generally along the y direction.

The x-direction seismic sensors 202 and 204 are spaced apart by a first distance $D_x$, while the y-direction seismic sensors 206 and 208 are spaced apart by a second distance $D_y$, where $D_x$ can be the same as or different from $D_y$.

The x-direction seismic sensors 202 and 204 produce respective outputs $X_1$ and $X_2$, while the y-directions seismic sensors 206 and 208 produce respective $Y_1$ and $Y_2$ outputs. If included in the assembly, a z-direction (vertical) seismic sensor 212 produces output Z (to provide a vertical component).

In the arrangement shown in FIG. 2, the vertical seismic sensor 212 is located generally in the center of horizontal seismic sensors 202, 204, 206, and 208. The vertical sensor is considered to be "generally in the center of the horizontal seismic sensors" if it is exactly equidistant to each of the horizontal seismic sensors, or the distances between the vertical seismic sensor and the corresponding horizontal seismic sensors are within ±5%, ±10% or ±20% of each other.

Each of the seismic sensors 202, 204, 206, 208 are electrically connected to the electrical cable 110 for communication of measurement data to the controller 150 (FIG. 1). In alternative implementations, instead of being connected to the electrical cable 110, the sensors 202, 204, 206, 208 can be connected to a wireless interface for communicating wireless signaling to the controller 150.

By mounting the seismic sensors on the support structure 210, target alignments and separations of the seismic sensors can be achieved. Moreover, the support structure 210 can be formed in a way to ensure equal coupling of the seismic sensors to the ground surface. Moreover, the sensor assembly 100A with the support structure 210 can be more quickly deployed in the field, since personnel do not have to spend time arranging the various seismic sensors of a sensor assembly to have certain orientations and to be within certain distances of each other.

As depicted, the seismic sensors are wired together into a single wire bundle or common interface. In addition to the seismic sensors, the sensor assembly 100A may also contain electronics for positioning, orientation, signal processing, and digitization. Moreover, a battery, storage media, and wireless interface can be employed for wireless transmission.

Within each pair of generally horizontal seismic sensors, it is desired that each of the seismic sensors in the pair have matching sensitivity. In cases where matching sensitivities of seismic sensors in a pair cannot be achieved, a calibration procedure can be added to the sensor assembly to calibrate recorded data.

In some embodiments, each separation distance $D_1$ and $D_y$ between respective seismic sensors 202 and 204 or 206 and 208 is set to smaller than half the shortest wavelength of the noise of interest. For example, for a noise velocity (e.g., ground-roll noise velocity) of 200 meters per second and a maximum frequency of 50 Hertz, the distance $D_x$ or $D_y$ can be set to smaller than 2 meters, or even smaller to 10 centimeters.

In some embodiments, the sensor distances $D_x$ and $D_y$ are variable. This makes the device adjustable to variations in noise velocities. For instance when a survey area has a noise velocity of 400 meters per second instead of 200 meters per second one can double the sensor distances. The sensor assembly may also contain an electric system that measures the distance and compensates the output of the device for the changes in the sensor distance.

In some embodiments, the support structure 210 when formed of a plate can be made of a relatively stiff material, such as steel or other metal. The wavefield propagation speed within a plate of such a relatively stiff material can be similar to or greater than the near surface compressional velocity of the soil beneath the sensor assembly. In such an implementation, an incident wavefield that excites a wavefield in the plate (210) will propagate faster than in the subsurface. The seismic sensors will therefore measure two waves for each incident wave, a fast plate wave propagating horizontally through the plate to the seismic sensors, and a slower wave propagating underneath the plate to the seismic sensors. The fast wave is relatively strong on the horizontal components and relatively weak on the vertical component. As a result, when the horizontal seismic sensor measurements are differentiated, the plate wave will be strongly attenuated as both generally horizontal seismic sensors of a pair will measure the plate wave almost at the same time. In contrast, the slower noise that propagates under the plate will dominate the differentiated signal.

Other techniques to attenuate the plate wave include the design and application of a filter either through modeling the plate response or by a calibration experiment where the seismic sensor responses are calibrated using carefully planted nearby seismic sensors.

In an alternative embodiment, the plate (210) can be made of a relative soft material such that the plate attenuates the propagation of plate waves. One example of the material that has such a characteristic is relatively soft plastic or foam with a propagation speed less than the soil underneath the plate. The plate can also be made to have holes to dampen the waves or the plate can be made of a variety of materials. In such implementations, a filter to attenuate plate waves may not be required, For stability and coupling, the plate may have a coupling mechanism, such as pins (e.g., 220 in FIG. 2) or grooves at the bottom surface of the plate, for engaging the ground surface. The plate may also be buried, or sandbags can be placed on top of the plate, to enhance coupling between the sensor assembly and the ground surface. Alternatively the plate may be soft and bendy to enhance the coupling.

As shown in FIG. 2, the mounting surface of the plate (210) on which the seismic sensors 202, 204, 206, 208, and 212 are mounted is generally rectangular. In alternative implementations, instead of using a plate with a generally rectangular mounting surface, a plate having an irregularly shaped mounting surface can be provided. An "irregularly shaped" mounting surface refers to a mounting surface of the plate that is not rectangular in shape.

Figure 3:
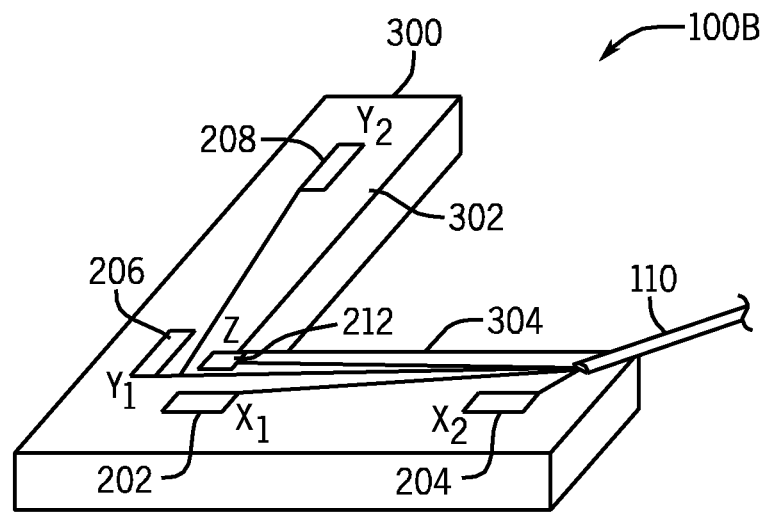

For example, the irregularly shaped mounting surface can be generally L-shaped, such as shown in FIG. 3, where the plate of a sensor assembly 100B is identified generally as plate 300. The plate 300 has a first segment 302 and a second segment 304 that are generally orthogonal to each other. The y-direction seismic sensors 206 and 208 are provided on the first segment, while the x-direction seismic sensors 202 and 204 are mounted on the other segment 304. The z-direction seismic sensor 212 can be mounted at any location on the plate.

Figure 4:
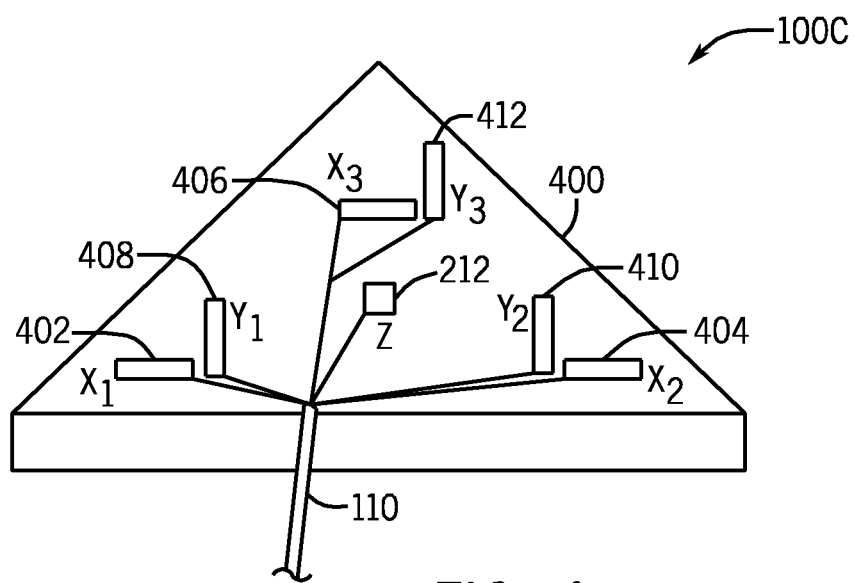

FIG. 4 shows an alternative embodiment of a plate 400 in a sensor assembly 100C, which has a generally triangular-shaped mounting surface. In the embodiment of FIG. 4, there are three x-direction seismic sensors (402, 404, and 406), and three y-direction seismic sensors (408, 410, and 412). The sensor assembly 100C shown in FIG. 4 also includes at least one z-direction seismic sensor 212.

The x-direction seismic sensors 402, 404, and 406 produce respective outputs $X_1$, $X_2$, $X_3$, while the y-direction seismic sensors 408, 410, and 412 produce respective outputs $Y_1$, $Y_2$, and $Y_3$.

Figure 6:
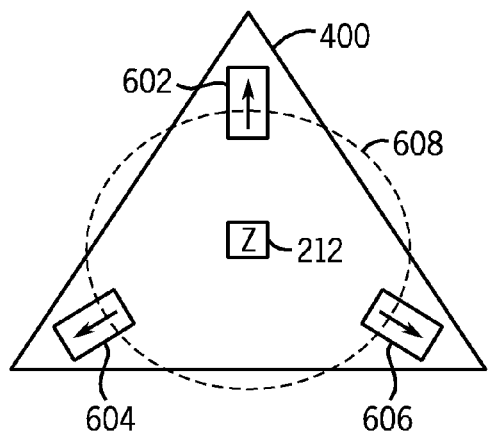
FIGS. 6-8 are schematic diagrams of further embodiments of a sensor assembly.

FIG. 6 depicts a variation of the FIG. 4 embodiments. According to FIG. 6, seismic sensors 602, 604, and 606 are mounted on the plate 400. The seismic sensors 602, 604, and 606 are arranged along a closed path 608 that is generally parallel to the surface of the plate 400 on which the sensors are mounted. Note that the path 608 is an imaginary path (in other words, it is not visible). In some implementations, the path 608 can be a circle, or alternative, can have other shapes, such as ellipsoid, oval, and so forth. The arrows depicted in the respective seismic sensors 602, 604, and 606 indicate the direction of sensitivity of the respective sensors. The direction of sensitivity of each seismic sensor 602, 604, and 606 points away from the vertical sensor 212 that is arranged inside the path 608. In the examples where the path 608 is a circle, the direction of sensitivity of each of the seismic sensors 602, 604, and 606 is perpendicular to the portion of the circle that the respective sensor intersects. The outputs of the seismic sensors 602, 604, and 606 can be combined (e.g., summed) by circuitry, such as the controller 150 of FIG. 1, to produce a signal output that is proportional to the divergence of the seismic wavefield.

Figure 7:
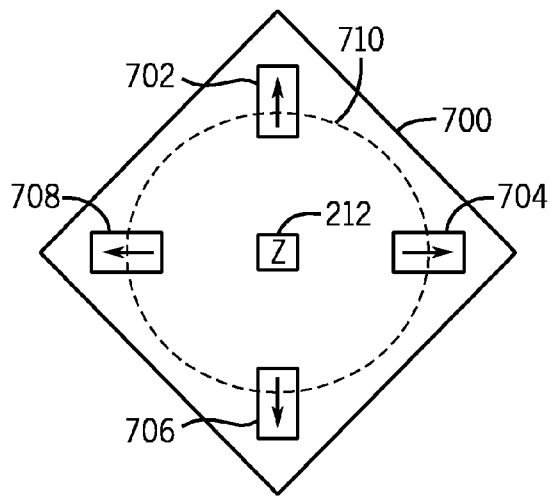

FIG. 7 is a variation of the FIG. 6 embodiments. In FIG. 7, a generally rectangular plate 700 is provided on which seismic sensors 702, 704, 706, and 708 are mounted. As indicated by the respective arrows, the seismic sensors 702, 704, 706, and 708 have directions of sensitivity that point away from the vertical sensor 212. The seismic sensors 702, 704, 706, and 708 are arranged along a path 710 in which the vertical sensor 212 is located. In some implementations, the path 710 can be a circle, or any other shape as noted above.

Figure 8:
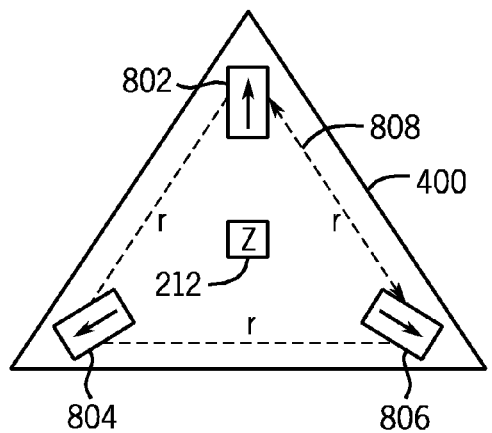

FIG. 8 shows the FIG. 6 configuration except with the path 608 omitted and replaced with triangle 808. The FIG. 8 assembly includes three horizontal geophones 802, 804, and 806 placed at the corners of an imaginary path 808 that in some implementations is an equilateral triangle. Thus the three sensors have the same distance r to each other. In the center of the triangle 808 is located a vertically oriented geophone 212. The direction of sensitivity of each of the horizontal geophones 802, 804, and 806 is at an angle of 120° with respect to the other two horizontal geophones. The directions of sensitivity of each of the geophones 802, 804, and 808 also point away from a point inside the triangle 808. The outputs, $S_1(t)$, $S_2(t)$, $S_3(t)$, of these three geophones 802, 804, and 806 are combined (e.g., summed) together and the combined output H(t) is proportional to the divergence of the seismic wavefield, as defined as follows:

$$H(t)=(S_1(t)+C_2 S_2(t)+C_3 S_3(t))/(r\cos(30°)).$$

In the equation above, $C_2$ and $C_3$ are optional calibration constants.

Figure 5:
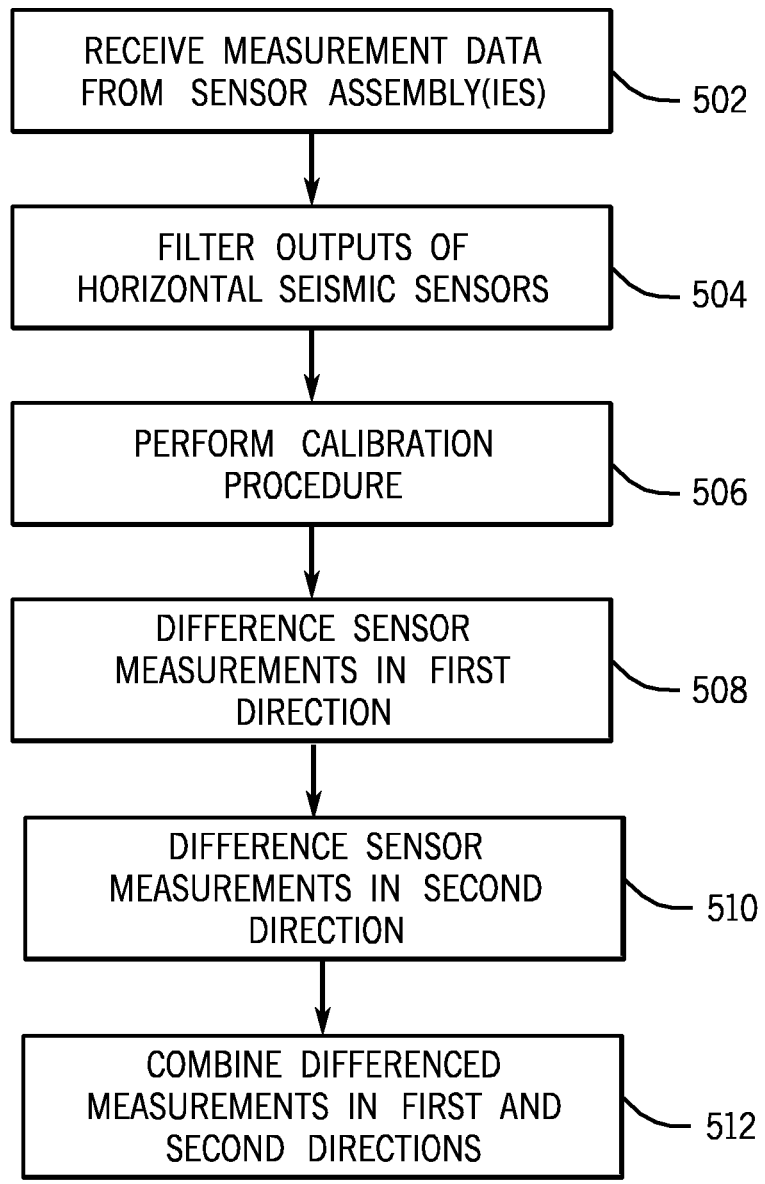
FIG. 5 is a flow diagram of a process of performing seismic surveying, in accordance with an embodiment.

FIG. 5 is a flow diagram of a process according to an embodiment for acquiring seismic survey data with noise mitigation. Measurement data is received (at 502) from a sensor assembly (or multiple sensor assemblies), such as any of the sensor assemblies 100, 100A, 100B, and 100C depicted in FIGS. 1-4. The receipt of the measurement data can be by the controller 150 depicted in FIG. 1. Assuming that the sensor assembly 100A according to the embodiment of FIG. 2 is used, the received measurement data includes $X_1$, $X_2$, $Y_1$, $Y_2$, and (optionally) Z. On the other hand, if the embodiment of FIG. 4 is used, then the received measurement data includes $X_1, X_2, X_3, Y_1, Y_2, Y_3$, and (optionally) Z.

The outputs of the horizontal seismic sensors are filtered (at 504). Such outputs include $X_1, X_2, Y_1, Y_2$, assuming the FIG. 2 embodiment is used. The filtering performed at 504 includes application of a frequency filter, such as a band pass filter, low pass filter, or high pass filter, to recondition the measurement data.

Next, a calibration procedure according to some embodiments is performed (at 506), such as by the controller 150 of FIG. 1. Performing the calibration procedure includes calculating calibration factors (also referred to as "calibration coefficients") for adjusting the outputs of some or all of the horizontal seismic sensors (202, 204, 206, and 208, assuming the FIG. 2 embodiment is used).

When performing the calibration procedure, an input stimulus is applied to the sensor assembly, where the input stimulus does not include noise, such as ground-roll noise. In one embodiment, a calibration coefficient calculated for the x-direction seismic sensors 202 and 204 includes a calibration coefficient $C_x$, which is used as follows:

$$\min \sum_t [X_1(t) - C_x X_2(t)]^2. \quad \text{(Eq. 1)}$$

Eq. 1 above seeks to minimize the difference between $X_1$ and the product of $C_x$ and $X_2$. The variable t in Eq. 1 above represents time. In a different embodiment, instead of just calculating one calibration coefficient $C_X$ to adjust $X_2$, another calibration coefficient can also be calculated to adjust $X_1$.

The foregoing involves calibrating outputs of just the x-direction seismic sensors 202 and 204. The same procedure can be applied to the horizontal sensors $Y_1$ and $Y_2$. Alternatively, it is possible to calibrate jointly all four of the horizontal seismic sensors using an input stimulus that propagates at some angle with respect to both the x and y directions, preferably at 45°. Such calibration is represented below:

$$\min \sum_t [X_1(t) - C_x X_2(t) + C_y Y_1(t) - C_{y2} Y_2(t)]^2. \quad \text{(Eq. 2)}$$

In Eq. 2 above, the calibration coefficients include $C_x$ (for adjusting $X_2$), $C_y$ (to adjust $Y_1$), and $C_{y2}$ (for adjusting $Y_2$). Eq. 2 seeks to minimize the sum of (1) a difference of the outputs of the x-direction seismic sensors 202 and 204 as adjusted by $C_x$, and (2) a difference of the outputs of the y-direction seismic sensors 206 and 208 as adjusted by $C_y$ and $C_{y2}$.

In case the seismic sensors are well matched to each other, the calibration coefficients $C_x$, $C_y$, and $C_{y2}$ can all be set to 1.

In an embodiment with two sets of three horizontal seismic sensors (such as in the embodiment of FIG. 4), horizontal gradients $$\left(\frac{dX}{dx} \text{ and } \frac{dY}{dy}\right)$$

are obtained according to:

$$\frac{dX}{dx} = \frac{C_x X_2 - X_1}{D_x}, \quad \text{(Eq. 3)}$$

$$\frac{dY}{dy} = \frac{\left[\frac{C_{y2} Y_2 + C_y Y_1}{2} - Y_3\right]}{D_y}. \quad \text{(Eq. 4)}$$

$D_x$ is the distance between the seismic sensors $X_1$ and $X_2$, and $D_y$ is the distance from $Y_3$ to a midpoint between $Y_1$ and $Y_2$. Their calibration coefficients $C_x$, $C_y$, and $C_{y2}$ can be derived in a similar way as for the four-seismic sensor configuration discussed above through minimization of their difference using measurements obtained in a suitable experiment/test:

$$\min \sum \left[\frac{dX}{dx}\right]^2,$$

$$\min \sum \left[\frac{dY}{dy}\right]^2.$$

Once the calibration coefficients have been determined, the sensor measurements in the first direction are differenced (at 508), and the sensor measurements in the second direction are differenced (at 510). Differencing the sensor measurements in the first direction refers to differencing outputs of the x-direction seismic sensors, while differencing the sensor measurements in the second direction refers to differencing outputs of the y-direction seismic sensors. The differenced outputs of the sensors in the first direction and the differenced outputs of the sensors in the second direction are combined (e.g., summed) (at 512), as follows:

$$H(t) = \left(\frac{X_1(t)}{D_x} - \frac{C_x X_2(t)}{D_x} + \frac{C_y Y_1(t)}{D_y} - \frac{C_{y2} Y_2(t)}{D_y}\right) \text{ or} \quad \text{(Eq. 5)}$$

$$H(t) = \left(\frac{\partial X}{\partial x} + \frac{\partial Y}{\partial y}\right). \quad \text{(Eq. 6)}$$

The output quantity H(t), which is the sum of the differenced outputs of the seismic sensors in the first and second directions, is proportional to the divergence of the wavefield at the free surface.

$$\frac{X_1(t)}{D_x} - \frac{C_x X_2(t)}{D_x}$$

In Eq. 5, the quantity represents the differencing of the sensor measurements in the first direction (x), and $$\frac{C_y Y_1(t)}{D_y} - \frac{C_{y2} Y_2(t)}{D_y}$$

represents the differencing of the sensor measurements in the second direction (y).

In Eq. 6, the quantity $$\frac{dX}{dx}$$

represents the differencing of the sensor measurements in the first direction (x), and $$\frac{dY}{dy}$$

represents the differencing of the sensor measurements in the second direction (y).

In one application, the divergence measurement can be used to remove noise from the vertical component (measured by the z-direction seismic sensor, such as 212 in FIG. 2) using an adaptive procedure. By employing various sensor assemblies according to some embodiments and the various algorithms discussed above, noise mitigation can be achieved by using just seismic sensors.

Alternatively, other applications of the divergence measurement include near-surface characterization, interpolation of horizontal component, or wavefield decomposition. The two horizontal gradients or the estimated divergence can be adaptively subtracted from the vertical component by minimizing the following equations for scaling factor C:

$$\min \sum \left[ Z - C \left[ \frac{dX}{dx} + \frac{dY}{dy} \right] \right]^2. \quad (Eq. 7)$$

$$\min \sum \left[ Z(t) - C \cdot \left( \frac{X_1(t)}{D_x} - \frac{C_x X_2(t)}{D_x} + \frac{C_y Y_1(t)}{D_y} - \frac{C_{y2} Y_2(t)}{D_y} \right) \right]^2. \quad (Eq. 8)$$

To calculate the scaling factor C, the sum of Eq. 7 or 8 is minimized. The scaling factor C may be time and/or frequency dependent. Eq. 7 or 8 removes ground-roll noise from the vertical component using the difference between pairs of horizontal components for a geometry as shown in FIG. 2, 3, or 4.

In the controller 150 of FIG. 1, instructions of the processing software 152 are loaded for execution on a processor (such as processor 154 in FIG. 1). The processor can include a microprocessor, microcontroller, processor module or subsystem (including one or more microprocessors or microcontrollers), an integrated circuit, or another control or computing device. As used here, a "processor" can refer to a single component or to plural components (e.g., one or multiple CPUs running in one or multiple computers). Certain of the computations discussed for performing some embodiments of the invention can be performed by the processing software 152 in the controller 150. Alternatively, computations can be performed by a processor in each sensor assembly in real time.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
providing first sensors spaced apart along a first direction;
providing second sensors spaced apart along a second direction generally orthogonal to the first direction;
performing, by a processor, differencing of outputs of the first sensors and differencing of outputs of the second sensors;
producing, by the processor, a signal output by combining the differenced outputs of the first sensors and the differenced outputs of the second sensors, wherein the signal output represents a seismic response of a subterranean structure; and
performing calibration of outputs of the first sensors, wherein performing the calibration comprises calculating at least one calibration factor to apply to at least one of the respective outputs of the first sensors.

2. The method of claim 1, wherein the first sensors and second sensors are located in a same plane.

3. The method of claim 2, wherein the first sensors measure motion in the first direction and the second sensors measure motion in the second direction.

4. The method of claim 1, wherein calculating the at least one calibration factor comprises calculating the at least one calibration factor based on the outputs of the first and second sensors that are responsive to an input stimulus without noise.

5. The method of claim 4, wherein calculating the at least one calibration factor comprises calculating the at least one calibration factor based on minimizing a difference between the outputs of the first and second sensors as adjusted by the at least one calibration factor.

6. The method of claim 1, further comprising:
providing a third sensor along a third direction that is generally orthogonal to the first and second direction.

7. The method of claim 1, comprising providing the first sensors and the second sensors on a support structure, wherein the support structure is on a ground surface.

8. The method of claim 1, comprising providing the first sensors and the second sensors on a ground surface.

9. A method comprising:
providing first sensors spaced apart along a first direction;
providing second sensors spaced apart along a second direction generally orthogonal to the first direction;
performing, by a processor, differencing of outputs of the first sensors and differencing of outputs of the second sensors;

producing, by the processor, a signal output by combining the differenced outputs of the first sensors and the differenced outputs of the second sensors, wherein the signal output represents a seismic response of a subterranean structure;

calculating at least one first calibration factor to apply to at least one of the respective outputs of the first sensors for producing calibrated outputs of the first sensors; and calculating at least one second calibration factor to apply to at least one of the respective outputs of the second sensors to produce calibrated outputs of the second sensors, wherein differencing the outputs of the first sensors comprises differencing the calibrated outputs of the first sensors, and wherein differencing the outputs of the second sensors comprises differencing the calibrated outputs of the second sensors.

10. The method of claim 9, wherein calculating the first and second calibration factors is based on minimizing a sum of (1) a difference of the outputs of the first sensors as adjusted by the at least one first calibration factor, and (2) a difference of the outputs of the second sensors as adjusted by the at least one second calibration factor.

11. A system comprising:
a controller comprising:
a storage media to store data from a sensor assembly that has spaced apart first seismic sensors that are arranged to measure signals in a first direction, and spaced apart second seismic sensors arranged to measure signals in a second direction that is generally orthogonal to the first direction; and
a processor configured to:
apply differencing to outputs of the first seismic sensors;
apply differencing to outputs of the second seismic sensors; and
produce a signal output by combining differenced outputs of the first seismic sensors and differenced outputs of the second seismic sensors, wherein the signal output represents a seismic response of a subterranean structure; and
perform calibration of outputs of the first seismic sensors, wherein performing the calibration comprises calculating at least one calibration factor to apply to at least one of the respective outputs of the first seismic sensors.

12. The system of claim 11, further comprising:
the sensor assembly and a communications link between the sensor assembly and the controller.

13. The system of claim 12, wherein an arrangement of the first seismic sensors and the second seismic sensors provides a first configuration of the sensor assembly, the system further comprising:
additional sensor assemblies having the first configuration, wherein the additional sensor assemblies are able to communicate with the controller over the communications link.

14. The system of claim 12,
wherein the first seismic sensors are spaced apart along the first direction by a distance that is less than half a wavelength of ground-roll noise traveling along a ground surface that is to be removed from the signal output, and the second seismic sensors are spaced apart along the second direction by a distance that is less than half the wavelength of the ground-roll noise.

15. The sensor assembly system of claim 14, wherein the sensor assembly further comprises a support structure on which the first and second seismic sensors are provided, where the sensor assembly further comprises:
a third seismic sensor on the support structure to measure a signal along a third direction, the third direction being generally orthogonal to both the first and second directions,
wherein an output of the third seismic sensor when combined with outputs of the first and second seismic sensors causes production of the signal output.

16. The system of claim 14, wherein the sensor assembly further comprises a support structure on which the first and second seismic sensors are provided, and wherein the support structure comprises a plate that is for provision on the ground surface.

17. The system of claim 16, wherein the plate is formed of a stiff material that has a seismic wavefield propagation speed greater than or equal to a seismic wavefield propagation speed of a ground underneath the plate.

18. The system of claim 16, wherein the plate is formed of a material to attenuate propagation of a seismic wavefield through the plate.

19. The system of claim 16, further comprising a coupler mechanism between the plate and the ground surface.

20. The system of claim 16, wherein the plate has a generally rectangular mounting surface on which the first and second seismic sensors are mounted.

21. The system of claim 16, wherein the plate has an irregularly shaped mounting surface on which the first and second seismic sensors are mounted.

* * * * *